United States Patent
Asano et al.

(10) Patent No.: US 6,300,408 B1
(45) Date of Patent: Oct. 9, 2001

(54) GRANULAR POWDER OF MODIFIED POLYTETRAFLUOROETHYLENE

(75) Inventors: Michio Asano; Masayuki Tsuji, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/381,101

(22) PCT Filed: Feb. 26, 1998

(86) PCT No.: PCT/JP98/00825

§ 371 Date: Sep. 15, 1999

§ 102(e) Date: Sep. 15, 1999

(87) PCT Pub. No.: WO98/41568

PCT Pub. Date: Sep. 24, 1998

(30) Foreign Application Priority Data

Mar. 17, 1997 (JP) .................................................. 9-084490

(51) Int. Cl.⁷ ...................................................... C08F 16/24
(52) U.S. Cl. ............................................ 524/544; 526/247
(58) Field of Search ............................... 524/544; 526/247

(56) References Cited

U.S. PATENT DOCUMENTS

| 3,331,822 | 7/1967 | Kometani et al. . | |
|---|---|---|---|
| 3,766,133 | 10/1973 | Roberts et al. . | |
| 3,953,412 | * 4/1976 | Saito | 526/247 |
| 4,368,296 | 1/1983 | Kuhls et al. . | |
| 5,153,285 | * 10/1992 | Felix | 526/206 |
| 5,763,082 | * 6/1998 | Kokumai | 428/402 |

FOREIGN PATENT DOCUMENTS

| 3-255133 | 11/1991 | (JP) . |
|---|---|---|
| 4-13729 | 1/1992 | (JP) . |
| 5-112690 | 5/1993 | (JP) . |
| WO 93/16126 | 8/1993 | (JP) . |
| 6-73189 | 3/1994 | (JP) . |
| 6-306179 | 11/1994 | (JP) . |

* cited by examiner

*Primary Examiner*—Paul R. Michl
(74) *Attorney, Agent, or Firm*—Armstrong, Westerman, Hattori, McLeland & Naughton, LLP

(57) ABSTRACT

To provide a modified PTFE granular powder which has a large apparent density, a small average particle size, a narrow particle size distribution, an electrostatic charge substantially approximate to zero, a small angle of repose and being excellent in powder characteristics, particularly particle stability. The modified PTFE powder is granulated with stirring in water under coexistence of an organic liquid which forms liquid-liquid interface with water and a non-ionic surfactant of segmented polyalkylene glycols which has a hydrophobic segment and a hydrophilic segment. A molded article obtained from the granular powder is excellent in tensile strength and elongation and has a small surface roughness, a large break down voltage and a large whiteness (Z value).

6 Claims, 4 Drawing Sheets

GRANULAR POWDER OF MODIFIED POLYTETRAFLUOROETHYLENE

TECHNICAL FIELD

The present invention relates to a modified polytetrafluoroethylene (PTFE) granular powder being excellent in powder characteristics, particularly stability of particles and having small electrostatic charge.

BACKGROUND ART

Hitherto many proposals with respect to a process for preparing a granular powder by pulverizing a PTFE powder prepared through suspension polymerization to an average particle size of less than 100 μm and then granulating have been made. For example, JP-B-44-22619 discloses a process for stirring and granulating a PTFE powder in an aqueous medium of 30° to 150° C. containing a water-insoluble organic liquid having a boiling point of 30° to 150° C.

In order to improve the process disclosed in the above-mentioned patent publication, JP-B-57-15128 discloses a process in which an equipment having mechanism for pulverizing a PTFE powder is employed.

As a process for granulating by using water only, for example, JP-B-43-8611 discloses a process for granulating in which a PTFE powder is stirred in water of 40° to 90° C., JP-B-47-3187 discloses a process for granulating in which a PTFE powder is stirred in an. aqueous medium of not less than 40° C., and further JP-A-3-259926 discloses a process for granulating in which a PTFE powder is stirred in an aqueous medium in combination use of pulverizing mechanism.

However, in such granulation processes, electrostatic charging occurs on the PTFE powder due to static electricity. The electrostatically charged PTFE powder adheres to not only a die mold but also a hopper and feeder due to static electricity at the time of molding, which results in lowering of flowability. Also, there is a tendency that the finer the powder is, the more the flowability and apparent density are lowered. From these points of view, the PTFE powder obtained by the above-mentioned processes is not satisfactory.

Also a granulation process with a roughly pulverized PTFE powder having an average particle size of not less than 100 μm has been proposed. As the process using a roughly pulverized powder, for example, JP-A-3-259925 discloses a process for granulating in which a PTFE powder of 420 μm particle size is stirred in an aqueous medium of 60° to 100° C. in combination use of pulverizing mechanism.

Even by the process disclosed in the above-mentioned patent publication, the obtained PTFE granular powder does not sufficiently satisfy physical properties of a molded article such as tensile strength, and for commercial production, a further step such as a gelling and pulverizing step is required. Also since a molded article obtained by molding the granular powder has a low break down voltage, it cannot be used for applications requiring a high break down voltage. Further as mentioned above, that process requires the pulverizing mechanism.

Also JP-B-3-39105 discloses a technique for preparing a granular powder by granulating a modified PTFE powder with stirring in hot water under coexistence of an organic liquid. With respect to the granular powder prepared by that method and having an apparent density of at least 700 g/liter (0.7 g/cm$^3$), when the powder has an average particle size of 150 to 250 μm, flowability f thereof is from 8.0 to 4.0 sec/50 g and particle stability s is from 8.0 to 4.0 sec/50 g, and when the powder has an average particle size of 250 to 1000 μm, flowability f thereof is from 4.0 to 1.5 sec/50 g and particle stability s is from 4.0 to 1.8 sec/50 g. Also it is disclosed therein that with respect to the granular powder having an apparent density of at least 800 g/liter (0.8 g/cm$^3$), when the powder has an average particle size of 150 to 250 μm, flowability f thereof is from 6.0 to 4.0 sec/50 g and particle stability s is from 6.0 to 4.0 sec/90 g, and when the powder has an average particle size of 250 to 1000 μm, flowability f thereof is from 3.0 to 1.5 sec/50 g and particle stability s is from 3.0 to 1.8 sec/50 g. The particle stability means flowability of a powder after a stress is applied mechanically to the powder, and is used for evaluating flowability after storing or transporting particles. Methods for measuring the flowability and particle stability are described hereinafter.

The modified PTFE granular powder disclosed in JP-B-3-39105 is surely improved in that the number of pores (measured as electrical defects) on a 200 μm thick sliced film obtained from an agglomerated molding powder is small under a voltage of 5000 V. However flowability is wholly insufficient (angle of repose: not less than 39 degrees). Also a relatively high flowability range (high apparent density and large particle size), a degree of lowering of particle stability, namely a particle stability coefficient (particle stability s/flowability f) is large (In Example 13, the particle stability coefficient 2.5/1.9=1.32).

Also that granular powder has high electrostatic charge of not less than 300 V. A break down voltage of a molded article obtained by molding the powder is as low as not more than 10 kV and a surface roughness is as rough as not less than 3.0 μm.

The present inventors have made intensive studies in view of the above-mentioned problems, and as a result, have found that those problems can be solved by granulating a modified PTFE powder in the presence of an organic liquid which forms liquid-liquid interface with water, and a specific nonionic surfactant with stirring in water.

Namely, an object of the present invention is to provide a modified PTFE granular powder being excellent in powder characteristics such as powder flowability, particularly particle stability and having a large apparent density, a small average particle size, a narrow particle size distribution, a small electrostatic charge (substantially approximate to zero) and a small angle of repose. The modified PTFE granular powder gives a molded article being excellent in physical properties such as elongation and surface smoothness and having a small surface roughness (smooth) and a large break down voltage.

DISCLOSURE OF THE INVENTION

The present invention relates to a modified polytetrafluoroethylene granular powder obtained by granulating a modified polytetrafluoroethylene powder prepared by copolymerizing 99 to 99.999% by mole of tetrafluoroethylene with 1 to 0.001% by mole of perfluoro(vinyl ether), in water under coexistence of a nonionic surfactant which has a hydrophobic segment comprising a poly(oxyalkylene) unit having 3 or 4 carbon atoms and a hydrophilic segment comprising a poly(oxyethylene) unit and an organic liquid which forms liquid-liquid interface with water, wherein:

(1) the granular powder has an electrostatic charge of not more than 50 V, preferably not more than 10 V, (2) the granular powder has an angle of repose of not more than 38 degrees, (3) the granular powder has an apparent density of not less than 0.7 g/cm$^3$ and less than 0.8 g/cm$^3$, (4) the granular powder having an average particle size of not less than 150 μm and less than 250 μm has flowability f of 2 to 3 sec/50 g and particle stability s of 2 to 3 sec/50 g, (5) the granular powder having an average particle size of 250 to 1000 μm has flowability f of 1 to 2 sec/50 g and particle stability s of 1 to 2 sec/50 g, (6) the granular powder has 1 to 1.3 of a particle stability coefficient s/f which is represented by particle stability s/flowability f, (7) a molded article obtained by molding the granular powder has a surface roughness of not more than 2.0 μm, and (8) a 0.1 mm thick skived sheet obtained by molding the granular powder has a break down voltage of not less than 12 kV.

Also the present invention relates to a modified polytetrafluoroethylene granular powder obtained by granulating a modified polytetrafluoroethylene powder prepared by copolymerizing 99 to 99.999% by mole of tetrafluoroethylene with 1 to 0.001% by mole of perfluoro(vinyl ether), in water under coexistence of a nonionic surfactant which has a hydrophobic segment comprising a poly(oxyalkylene) unit having 3 or 4 carbon atoms and a hydrophilic segment comprising a poly(oxyethylene) unit and an organic liquid which forms liquid-liquid interface with water, wherein:

(1) the granular powder has an electrostatic charge of not more than 50 V, preferably not more than 10 V, (2) the granular powder has an angle of repose of not more than 37 degrees, (3) the granular powder has an apparent density of not less than 0.8 g/cm³ and less than 0.9 g/cm³, (4) the granular powder having an average particle size of not less than 150 μm and less than 250 μm has flowability f of 2 to 3 sec/50 g and particle stability s of 2 to 3 sec/50 g, (5) the granular powder having an average particle size of 250 to 1000 μm has flowability f of 1 to 2 sec/50 g and particle stability s of 1 to 2 sec/50 g, (6) the granular powder has 1 to 1.3 of a particle stability coefficient s/f which is represented by particle stability s/flowability f, (7) a molded article obtained by molding the granular powder has a surface roughness of not more than 2.5 μm, and (8) a 0.1 mm thick skived sheet obtained by molding the granular powder has a break down voltage of not less than 11 kV.

Further the present invention relates to a modified polytetrafluoroethylene granular powder obtained by granulating a modified polytetrafluoroethylene powder prepared by copolymerizing 99 to 99.999% by mole of tetrafluoroethylene with 1 to 0.001% by mole of perfluoro(vinyl ether), in water under coexistence of a nonionic surfactant which has a hydrophobic segment comprising a poly(oxyalkylene) unit having 3 or 4 carbon atoms and a hydrophilic segment comprising a poly(oxyethylene) unit and an organic liquid which forms liquid-liquid interface with water, wherein:

(1) the granular powder has an electrostatic charge of not more than 50 V, preferably not more than 10 V, (2) the granular powder has an angle of repose of not more than 36 degrees, (3) the granular powder has an apparent density of not less than 0.9 g/cm³, (4) the granular powder having an average particle size of not less than 150 μm and less than 250 μm has flowability f of 2 to 3 sec/50 g and particle stability s of 2 to 3 sec/50 g, (5) the granular powder having an average particle size of 250 to 1000 μm has flowability f of 1 to 2 sec/50 g and particle stability s of 1 to 2 sec/50 g, (6) the granular powder has 1 to 1.3 of a particle stability coefficient s/f which is represented by particle stability s/flowability f, (7) a molded article obtained by molding the granular powder has a surface roughness of not more than 3.0 μm, and (8) a 0.1 mm thick skived sheet obtained by molding the granular powder has a break down voltage of not less than 10 kV.

BEST MODE FOR CARRYING OUT THE INVENTION

Figure 1:
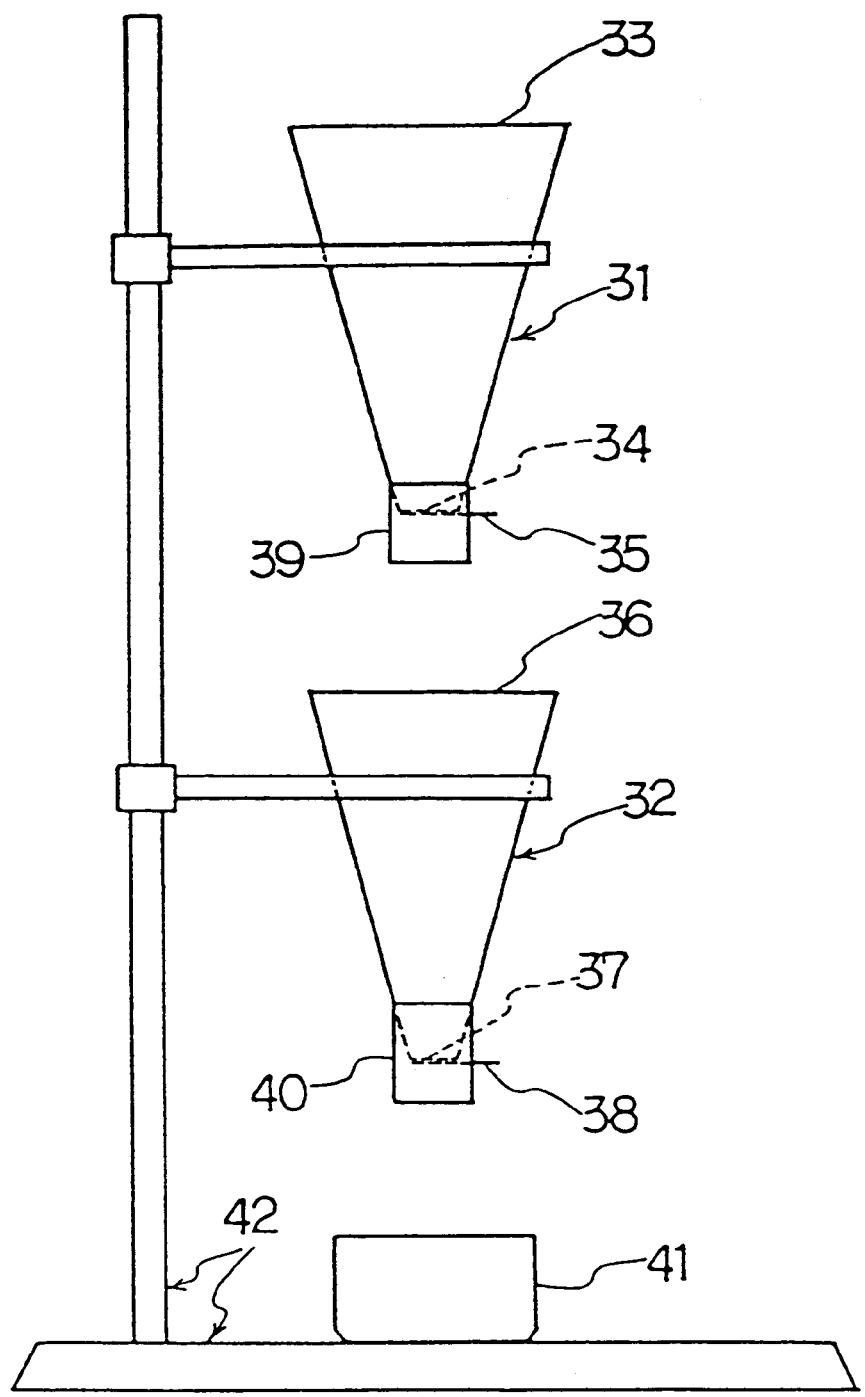
FIG. 1 is a diagrammatic view of an apparatus used for determining flowability of the granular powder in the present invention.

A modified PTFE powder used in the present invention is a powder prepared by usual suspension polymerization and comprising a copolymer of tetrafluoroethylene (TFE) and perfluoro(vinyl ether), etc. An average particle size of the powder after pulverization is less than 100 μm, preferably not more than 50 μm, and a lower limit thereof is defined by a pulverizing apparatus and pulverizing technique. The average particle size is usually from 30 to 40 μm.

As the perfluoro(vinyl ether) copolymerizable with TFE, there are, for example, one represented by the formula (I):

$$CF_2=CF-OR_f \quad (I)$$

wherein $R_f$ is a perfluoroalkyl group having 1 to 10 carbon atoms, a perfluoro(alkoxyalkyl) group having 4 to 9 carbon atoms, an organic group represented by the formula (II):

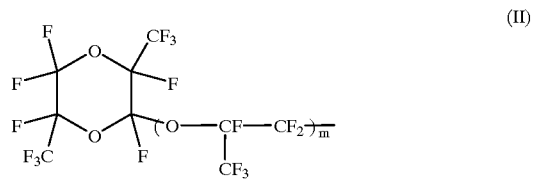

in which m is 0 or an integer of 1 to 4, or an organic roup represented by the formula (III):

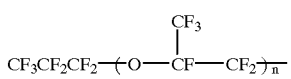
(III)

in which n is an integer of 1 to 4, and the like.

The number of carbon atoms of the above-mentioned perfluoroalkyl group is from 1 to 10, preferably from 1 to 5. When the number of carbon atoms is within the above-mentioned range, an excellent creep resistance can be obtained with maintaining the property of being not-meltprocessable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoints of creep resistance and cost of monomer, perfluoropropyl is preferable.

When a proportion of the perfluoro(vinyl ether) is within the range of 1.0 to 0.001% by mole, an excellent creep resistance can be obtained.

In the present invention, it is preferable to pulverize the above-mentioned modified PTFE powder to particles having an average particle size of less than 100 μm, particularly preferably not larger than 50 μm, for example, in the presence of water or under dry condition by means of a pulverizing machine such as hammer mill, crusher equipped with a rotor having blades, jet mill or impact mill. The use of those particles having the average particle size in the above-mentioned range gives such effects that the molded articles obtained by molding after the granulation have good physical properties.

The organic liquid which is used in the present invention may be an organic liquid capable of forming a liquid-liquid interface with water and being present as droplets in water or may be one which dissolves somewhat in water if it is capable of forming droplets in water and a liquid-liquid interface with water. Examples thereof are, for instance, alcohols such as 1-butanol and 1-pentanol; ethers such as diethyl ether and dipropyl ether; ketones such as methyl ethyl ketone and 2-pentanone; aliphatic hydrocarbons such as pentane and dodecane; aromatic hydrocarbons such as benzene, toluene and xylene; halogenated hydrocarbons such as methylene chloride, tetrachloroethylene, trichloroethylene, chloroform, chlorobenzene, trichlorotrifluoroethane, monofluorotrichloromethane, difluorotetrachloroethane, 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane; and the like. Among them, the halogenated hydrocarbons are preferable, and particularly preferable are chlorinated- and fluorochlorinated-hydrocarbons such as 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane. Those are nonflammable and satisfy requirements for flon restrictions. Those organic liquids may be used solely or in combination use of two or more thereof.

An amount of the above-mentioned liquid-liquid interface-forming organic liquid is from 30 to 80% (% by weight, hereinafter the same), preferably 40 to 60% on the basis of the modified PTFE powder.

In the present invention, it appears that the granulation of the modified PTFE powder is conducted in the droplets of the above-mentioned liquid-liquid interface-forming organic liquid and that, since the droplets of the liquid become smaller and more approximate to a spherical form because of functioning of a specific nonionic surfactant, Darticles having a smaller average particle size and a form near sphere can be obtained, and an apparent density of the granular powder is increased and the particle stability thereof is enhanced.

Examples of the above-mentioned specific nonionic surfactant are segmented polyalkylene glycols having a hydrophobic segment comprising poly(oxyalkylene) unit having 3 or 4 carbon atoms and a hydrophilic segment comprising poly(oxyethylene) unit and the derivatives thereof.

As the segmented polyalkylene glycols having a hydrophobic segment and hydrophilic segment, preferable are, for example, those represented by the formula (IV):

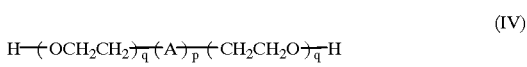
(IV)

wherein A is

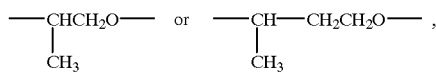

p is an integer of 5 to 200, q is an integer of 2 to 400. From the viewpoint of being easily adsorbed in the modified PTFE resin, it is preferable that p is from 15 to 40 and q is from 7 to 100.

Among them, preferable is:

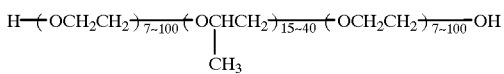

An amount of the above-mentioned specific onionic surfactant is from 0.01 to 5%, preferably from 0.1 to 0.3% on the basis of the modified PTFE powder.

By using the specific nonionic surfactant in the above-mentioned range, there can be obtained a granular powder being in the spherical form and having a small particle size, a narrow particle size distribution, an excellent powder flowability and a large apparent density.

In the present invention, as the surfactant, the anionic surfactant may be used in combination use of the nonionic surfactant. In case of the combination use of the anionic surfactant with the nonionic surfactant, the amount of the anionic surfactant is from 0.001 to 5% based on the modified PTFE powder. (In case of the combination use, the amount of the nonionic surfactant is the same as mentioned above.)

As the anionic surfactant, there can be used known ones, for example, higher fatty acid and its salt, alkyl sulfate, alkyl sulfonate, alkyl aryl sulfonate, alkyl phosphoric acid ester and the like. Particularly preferable anionic surfactants are a sulfate of higher alkyl alcohol, for example, sodium lauryl sulfate or a fluorine-containing sulfonic acid type- or carboxylic acid type-anionic surfactant having a fluoroalkyl group or chlorofluoroalkyl group. The typical compounds thereof are those represented by the formula (V):

(V)

or the formula (VI):

(VI)

wherein X is hydrogen, fluorine atom or chlorine atom, n is an integer of 3 to 10, m is 0 or an integer of 1 to 4, A is carboxyl group, sulfonic acid group or an alkali metal or ammonium residue thereof.

In the present invention, though a filler may be further added, it is preferable, from the viewpoints of particle stability and electrical characteristics that the filler is not added.

The modified PTFE granular powder of the present invention is prepared, for exmple, by a method mentioned below, but the method is not limited thereto.

(1) A 200-liter granulation tank equipped with cone blades is charged with 120 to 150 liters of deionized water and a temperature inside the tank is adjusted to 20° to 28° C.

(2) Then the tank is charged with 30 kg of the modified PTFE powder previously pulverized to less than 40 µm.

(3) A given amount of the surfactant is added with rotating the cone blades at 400 rpm. Two to three minutes after the addition, a given amount of the above-mentioned organic liquid is added.

(4) The stirring is continued at 400 rpm for five minutes to make the organic liquid and modified PTFE powder being compatible with each other.

(5) A mixture in the tank is taken out of the tank to pass through a line mixer for pulverization by external circulation for ten minutes.

(6) The inside temperature of the granulation tank is increased to 37° to 39° C. over 15 to 30 minutes. This temperature is optionally changed depending on aimed quality of a granulate.

(7) The inside temperature of the tank is kept at 37° to 39° C. for 15 to 60 minutes to distill off the organic liquid. During that period of time, the number of rotations of the cone blade is 400 rpm. That period of time is optionally changed depending on aimed quality of a granulate.

(8) The granulate is separated from water with a 150 mesh sieve after the stirring is stopped.

(9) The separated granulate is dried at 165° C. for 20 hours with a box type hot air recirculating dryer.

With respect to the modified PTFE granular powder of the present invention, its physical properties vary depending on its apparent density. The apparent density of the granular powder can be adjusted by, for example, (a) changing an amount of the organic liquid forming liquid-liquid interface with water (the apparent density is decreased by increasing the amount of the organic liquid), (b) changing a granulation time (residence time of particles) in water (the apparent density is increased by increasing the granulation time) or (c) changing a period of time of the above external circulation (5) (pulverization) (the apparent density is increased by increasing the circulation period of time).

According to the process of the present invention for preparing a modified PTFE granular powder, for example, a granular powder which has physical properties mentioned below and provides molded products with physical properties described below can be obtained. Particularly since the particle size distribution is narrow, a complicated step of taking out particles of a small size with a sieve like a conventional method is not necessary. Thus, the modified PTFE granular powder which cannot be prepared by a conventional process can be prepared.

Physical Properties of Modified PTFE Granular Powder of the Present Invention

Apparent density: not less than 0.7 g/cm$^3$
When less than 0.7 g/cm$^3$, an amount of powder to be filled in a die is small.
Flowability (21B mehtod): not less than 6 times
When not more than 5.5 times, flowability in a opper is not so good. Particularly 8 times is referable.

Angle of repose: not more than 38 degrees
The powder having an angle of repose exceeding 38 degrees is not preferable because its flowability is not good.

The angle of repose is not more than 38 degrees when the apparent density is not less than 0.7 g/cm$^3$ and less than 0.8 g/cm$^3$; not more than 37 degrees when the apparent density is not less than 0.8 g/cm$^3$ and less than 0.9 g/cm$^3$; and not more than 36 degrees when the apparent density is not less than 0.9 g/cm$^3$.

An angle of repose of a powder is affected by a gravity and becomes smaller as an apparent density becomes higher. Accordingly, the powder obtained by the process of the present invention changes its angle of repose depending on its apparent density. The powders of the present invention have smaller angle of repose than that of powders obtained by conventional techniques.

The angle of repose of the powders obtained by the conventional techniques is not less than 40 degrees when the apparent density is not less than 0.6 g/cm$^3$ and less than 0.9 g/cm$^3$; not less more than 38 degrees when the apparent density is not less than 0.9 g/cm$^3$ and less than 1.0 g/cm$^3$; and not less than 36 degrees when the apparent density is not less than 1.0 g/cm$^3$.

Particle size distribution A:
  Granular powder remaining on a 10 mesh sieve: 0%
  Granular powder remaining on a 20 mesh sieve: not more than 5%

The granular powder having the particle size distribution mentioned above after granulated is preferable since it is filled uniformly in the die because the particle size is uniform. It is particularly preferable that the granular powder remaining on the 10 mesh and 20 mesh sieves is 0%.

Particle size distribution B: not less than 50% by weight
The granular powder having the above-mentioned particle size distribution after granulated is preferable because it is filled uniformly in the die. Particularly not less than 60% by weight is preferable.

Average particle size: not more than 1000 µm
When larger than 1000 µm, the powder cannot be filled in the thin-walled die. Particularly preferable is from 250 to 300 µm from the viewpoint of filling the powder in the thin-walled die.

Electrostatic charge: not more than 50 V
A PTFE powder having an electrostatic charge exceeding 50 V adheres to not only a die but also a hopper and feeder due to static electricity at the time of molding, which results in lowering of flowability. A preferable amount is not more than 10 V. In such an amount, the above-mentioned problem does not occur at all.

Flowability f (Hoechst method) and particle stability s (Hoechst method):

(1) Granular powder having an average particle size of not less than 150 µm and less than 250 µm
  The flowability f is 2 to 3 sec/50 g, and the particle stability s is 2 to 3 sec/50 g. Flowability is excellent when the flowability f and particle stability s are both smaller.

(2) Granular powder having an average particle size of 250 to 1000 µm
  The flowability f is 1 to 2 sec/50 g, and particle stability s is 1 to 2 sec/50 g. Flowability is excellent when the flowability f and particle stability s are both smaller.

Particle stability coefficient s/f:
All over the ranges of apparent density and average particle size, the particle stability coefficient is from 1 to 1.3, preferably from 1 to 1.1. When the particle stability coefficient approaches 1, flowability change after application of mechanical force becomes smaller. Therefore, good flowability is maintained after transporting, packaging and storing.

Physical Properties of Molded Article

Tensile strength: not less than 100 kgf/cm$^2$

When less than 100 kgf/cm$^2$, the molded article is inferior in mechanical strength. Preferable tensile strength is not less than 150 kgf/cm$^2$ and the tensile strength is determined in that range depending on its application.

Elongation: 100 to 400%

When less than 100%, there is a case where the molded article is cut when mounted on an equipment or processed. Preferable elongation is not less than 150%.

Surface roughness: not larger than 3.0 µm

A molded article having a surface roughness larger than 3.0 µm is not preferable because surface irregularity is large. Particularly preferable surface roughness is not larger than 2.0 µm when the apparent density is not less than 0.7 g/cm$^3$ and less than 0.8 g/cm$^3$, not larger than 2.5 µm when the apparent density is not less than 0.8 g/cm$^3$ and less than 0.9 g/cm$^3$ and not larger than 3.0 µm when the apparent density is not less than 0.9 g/cm$^3$.

Break down voltage: not less than 10 kV

Break down voltage is a characteristic required when a molded article is used for a high voltage insulating material such as an insulating tape for condenser for high voltage transformer or an insulating nozzle for circuit breaker. The break down voltage is preferably not less than 10 kV, particularly not less than 12 kV when the apparent density is not less than 0.7 g/cm$^3$ and less than 0.8 g/cm$^3$; not less than 11 kV when the apparent density is not less than 0.8 g/cm$^3$ and less than 0.9 g/cm$^3$; and not less than 10 kV when the apparent density is not less than 0.9 g/cm$^3$.

Whiteness (Z value): not less than 95

A PTFE molded article has a higher whiteness as compared with usual resins. From the commercial viewpoint, a higher whiteness is preferred.

The methods of measuring each physical property are described below.

Apparent density: Measured in accordance with JIS K 6891–5.3

Average particle size after pulverization (Primary particle size):

Wet sieve method: JIS standard sieves of 20 mesh (sieve opening: 840 µm), 250 mesh (sieve opening: 62 µm), 270 mesh (sieve opening: 53 µm), 325 mesh (sieve opening: 44 µm) and 400 mesh (sieve opening: 37 µm) are used. First, the 20 mesh sieve is placed on the 250 mesh sieve, and 5 g of a sample powder is put on the 20 mesh sieve. By spraying carbon tetrachloride carefully with a sprayer at a rate of about 3 liters/m$^2$ for about 30 seconds, the powder is rinsed on the lower sieve. When the sample powder has been rinsed completely, the upper sieve is removed and spraying all over the lower sieve is conducted for about four minutes. After that, the lower sieve is air-dried and a weight of the dried powder remaining thereon is measured. A series of the above-mentioned steps are repeated by using the 20 mesh sieve and each of the other three sieves of smaller meshes, respectively, and 5 g each of new sample powder is used. In order to obtain an accumulated weight percentage, the weights of the powder remaining on each sieve are multiplied by 20 and then those obtained values are plotted on a logarithmic probability paper to openings of each sieve. Those plotted points are connected with a line, particle sizes corresponding to the accumulated percentages 50($d_{50}$) and 84($d_{34}$) are read, and wet sieve size ($d_{ws}$) is calculated by the following equation.

$$\log_e d_{ws} = \log_e d_{50} - \frac{1}{2}\left(\log_e \frac{d_{34}}{d_{50}}\right)^2$$

Flowability(21B method): Measured in accordance with the method described in JP-A-3-259925.

Figure 3:
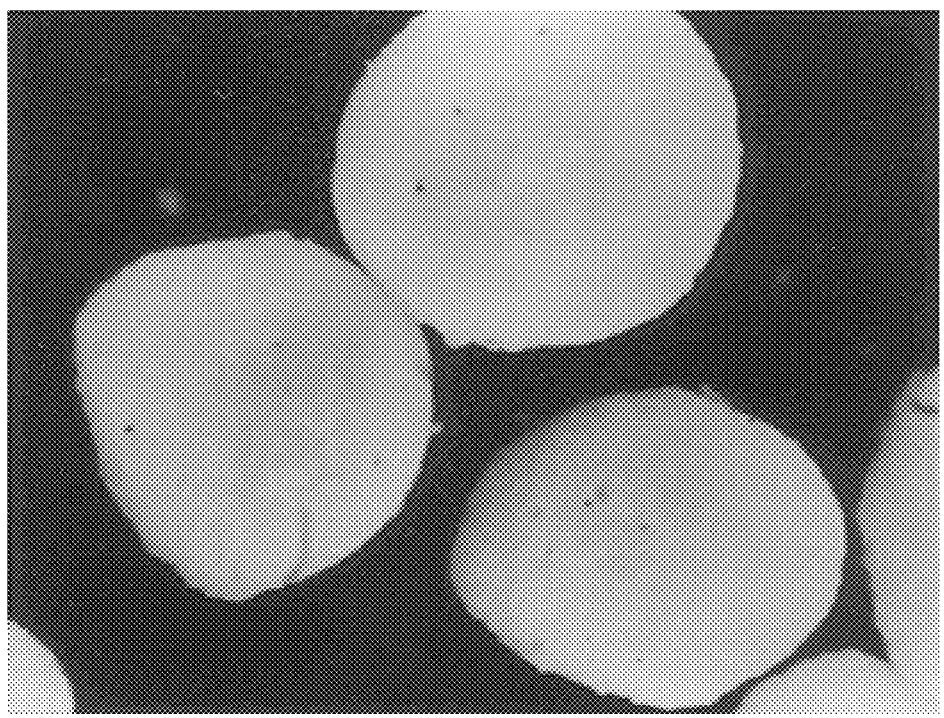
FIG. 3 is an optical microscopic photograph (magnification: ×100) showing a structure of particles in the modified PTFE granular powder of the present invention, which was obtained in Example 3.

Namely, there is used a measuring device comprising a support base 42 and an upper hopper 31 and a lower hopper 32, the both of which are aligned on their center lines and supported on the support base 42 as shown in FIG. 1 (corresponding to FIG. 3 described in JP-A-3-259925). The upper hopper 31 has an inlet 33 of 74 mm diameter, an outlet 34 of 12 mm diameter and a partition plate 35. The height from the inlet 33 to the outlet 34 is 123 mm. The partition plate 35 is provided on the outlet 34, and thereby the powder in the hopper can be kept therein and dropped optionally. The lower hopper 32 has an inlet 36 of 76 mm diameter, an outlet 37 of 12 mm diameter and a partition plate 38. The height from the inlet 36 to the outlet 37 is 120 mm, and the partition plate 38 is provided on the outlet 37 like the upper hopper. The upper hopper and the lower hopper are adjusted so that the distance between the both partition plates is 15 cm. In FIG. 1, the numerals 39 and 40 indicate outlet covers of each hopper, and the numeral 41 indicates a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680µm). The measurement of the flowability is carried out at the same temperature.

(I) At first, immediately after the upper hopper 31 is charged with just a cup of powder by using a 30 cc cup, the partition plate 35 is pulled out to drop the powder into the lower hopper. When the powder does not drop, the powder is stuck with a wire. After the powder has dropped completely into the lower hopper 32, the dropped powder is allowed to stand for 15±2 seconds, and then the partition plate 38 of the lower hopper is pulled out to see whether the powder is dropped or not from the outlet 37. When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good." In case where the powder is never dropped, the flowability of the powder is estimated to be "Not good." In case where in three series of the dropping test, the powder has been dropped only one time, the dropping test is further conducted twice, and when the two series of the dropping test are both satisfactory, the flowability is estimated to be "Good." In other cases, the flowability is estimated to be "Not good."

(III) With respect to the powder estimated to be "Good," the upper hopper is charged with two cups of powder by using the same 30 cc cup, and the dropping test of the powder is conducted in the same manner as above. When as a result, the flowability is estimated to be "Good," the number of cups filled with the powder is increased successively and the dropping test is continued until the flowability is estimated to be "Not good." The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is subtracted by 1, and the obtained value is taken as "Flowability" of the powder.

Average particle size and particle size distribution A of granular powder:

Standard sieves of 10, 20, 32, 48, 60 and 83 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size. Also percents by weight of the granular powder remaining on each sieve of 10, 20, 32, 48, 60 and 83 meshes are regarded as the particle size distribution A.

Particle size distribution B:

The particle size distribution B is a proportion in weight of the Darticleg having a diameter 0.7 to 1.3 times the average particle size on the basis of the whole particles, and is calculated by multiplying the average particle size by 0.7 or 1.3. The obtained values are plotted on the accumulated weight percentage curve, and thus the weight percentage is obtained.

Electrostatic charge: Handy Electrostatic Meter SFM775 available from Ion Systems, Inc. is used to determine an electrostatic charge.

Flowability f (Hoechst method): Method disclosed in JP-B-3-39105

An aluminum funnel covered with PTFE (inside diameter of its top: 74 mm, inside diameter of its bottom: 12 mm, height: 89 mm) is fixed to a commercially available vibrator (equipped with a column and available from GL Science Kabushiki Kaisha) so that a distance between a motor casing of the vibrator and the center of the funnel is 90 to 100 mm. The funnel is filled with 50 g of a product and the vibrator having a vibration width of 0.5 to 1 mm is turned on. Then a period of time from opening of an outlet of the funnel upto the funnel becoming empty completely is measured. The shorter the powder falling time is, the better the powder flowability is. Before measuring the flowability, coarse particles having a particle size exceeding 1500 μm are removed from the powder to be measured.

Particle stability s (Hoechst method): Method disclosed in JP-B-3-39105

A rotation shaft of a stirrer equipped with two blades is set in a cylindrical concave which has a depth of 3 mm and a diameter of 5 mm and is provided at the center of the bottom of an aluminum beaker having an inside diameter of 100 mm and a height of 150 mm. The beaker is charged with 50 g of a powder, followed by stirring at 200 rpm for five minutes. A distance between the bottom of the blade and the bottom of the beaker is 1.5 mm. The blades have a thickness of 1.5 mm, a width of 25 mm and a length of 46 mm. Both blades are inclined at an angle of 45° against the stirring shaft and are at a right angle to each other. The edges of the blades are slightly round. Before starting the stirring, about 0.1 g of aluminum oxide is added to the powder to prevent electrostatic charging. Also in this measurement, coarse particles having a particle size exceeding 1500 μm are removed previously from the powder to be measured.

Then with respect to the product obtained by stirring in the aluminum beaker, its flowability is measured by the above Hoechst method. A value of flowability obtained after application of mechanical stress is used as evaluation for particle stability. By comparing the values of powder flowability before and after the stirring, a degree of the fracture of particles under mechanical stress can be measured.

Tensile strength (hereinafter may be referred to as "TS") and elongation (hereinafter may be referred to as "EL"):

A die having an inner diameter of 100 mm is charged with 25 g of powder, and a pressure is applied gradually over about 30 seconds until the final pressure becomes about 300 kg/cm². Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-58 by stretching at a stretching rate of 200 mm/min with an autograph having a gross weight of 500 kg.

Angle of repose:

Measured with Powder Tester available from Hosokawa Micron Co., Ltd.

Surface roughness:

A 50 mm diameter die mold is charged with 210 g of powders and maintained for five minutes at a molding pressure of 300 kg/cm². The obtained pre-molded article is heated up from room temperature to 365° C. at a heating rate of 50° C./hr. After maintained at 365° C. for 5.5 hours, the pre-molded article is cooled at a cooling rate of 50° C./hr. The top surface of the obtained molded article is measured according to the center line average roughness ($R_a$) method described in JIS B 0601 by using a surface roughness measuring device available from Tokyo Seimitsu Kikai Kabushiki Kaisha.

Break down voltage:

A block of a molded article which is produced in the same manner as for measurement of the Z value is cut to give a 0.1 mm thick skived sheet. The break down voltage is measured by using the obtained skived sheet according to JIS K 6891.

Z value:

A 50 mm diameter die was filled with 200 g of a granular powder and then maintained at a molding pressure of 300 kg/cm² for five minutes. The obtained pre-molded article (diameter: about 50 mm, thickness: 50 mm) was heated up from room temperature to 365° C. at a temperature raising rate of 50° C./hr. After having been maintained at 365° C. for 5.5 hours, the pre-molded article was cooled at a cooling rate of 50° C./hr and then the molded article was cut crosswise with a lathe at the point about 25 mm from its end (at its center portion). Then a Z value on the center of the cut portion was measured by the Z value measuring method of the XYZ calorimetric system of Commission International de Leclairage.

The preferred proportion of each component for preparing the modified PTFE granular powder of the present invention is, for example, as follows:

| | |
|---|---|
| Modified PTFE powder | 100 parts |
| Specific nonionic surfactant (on the basis of the modified PTFE powder) | 0.01 to 5% by weight |
| Liquid-liquid interface-forming organic liquid | 30 to 80 parts |

The modified PTFP granular powder prepared from those components in the proportion mentioned above is advantageous from viewpoints of a large apparent density, a small angle of repose and good flowability. More preferable are the components mentioned below.

| | |
|---|---|
| Modified PTFE powder | 100 parts |
| Specific nonionic surfactant (on the basis of the modified PTFE powder) | 0.1 to 0.3% by weight |
| Liquid-liquid interface-forming organic liquid | 40 to 60 parts |

The modified PTFE granular powder prepared from those components in the proportion mentioned above is advantageous from viewpoints of a small average particle size and a narrow particle size distribution and from such a point that a surface roughness of a molded article obtained from the granular powder is small.

The present invention is then explained by means of Examples, but is not limited thereto.

EXAMPLE 1

A 200-liter granulation tank equipped with cone blades was charged with 120 to 150 liters of deionized water, and a temperature of the tank was adjusted to 20° to 28° C. Then, the tank was charged with 30 kg of a modified PTFE powder (POLYFLON M-111 available from Daikin Industries, Ltd., modified with 0.1% by mole of perfluoropropylene vinyl ether) prepared by suspension polymerization and pulverized to an average particle size of 25 μm. A specific nonionic surfactant (Puronon #104 represented by:

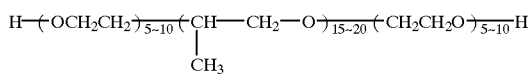

and available from Nippon Yushi Kabushiki Kaisha) was then added in an amount of 0.100% with rotating the cone blades at 400 rpm. Two to three minutes after, 19.1 kg of $CH_2Cl_2$ was added as an organic liquid. Subsequently after stirring at 400 rpm for five minutes to make the organic liquid compatible with the PTFE powder, the mixture in the tank was fed to a line mixer outside the tank for external circulation for 20 minutes. The inside of the tank was heated up to 37° to 39° C. over 15 minutes and maintained at that temperature for 15 to 60 minutes to distill off the organic liquid. During that period of time, the rotation of the cone blades was maintained at 400 rpm.

After stopping the stirring, granulates were separated from water by using a 150 mesh sieve, and the sieved granulates were dried at 165° C. for 20 hours with a box type hot air recirculating dryer to give a granular powder of the present invention.

Physical properties of the obtained modified PTFE granular powder and a molded article obtained from the powder were determined by the methods mentioned above.

The results are shown in Table 1.

EXAMPLES 2 to 10

The same procedures as in Example 1 were repeated except that the amounts and kinds of the surfactant and the amount of the organic liquid forming a liquid-liquid interface with water were changed to values shown in Table 1, to give a modified PTFE granular powder of the present invention. The same tests as in Example 1 were carried out. The results thereof are shown in Table 1.

The nonionic surfactant used in Example 4 is one mentioned below.

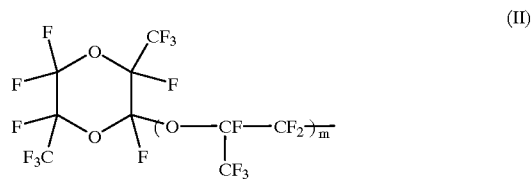

(II)

available from Nippon Yushi Kabushiki Kaisha.

Also, with respect to the modified PTFE granular powder obtained in Example 3, the photographs of the particles in the powder were taken in the following way.

Shape of particle: By using a Video Microscope of optical microscope available from SONY Corporation, photographs were taken at ×100 magnification and ×200 magnification.

Figure 2:
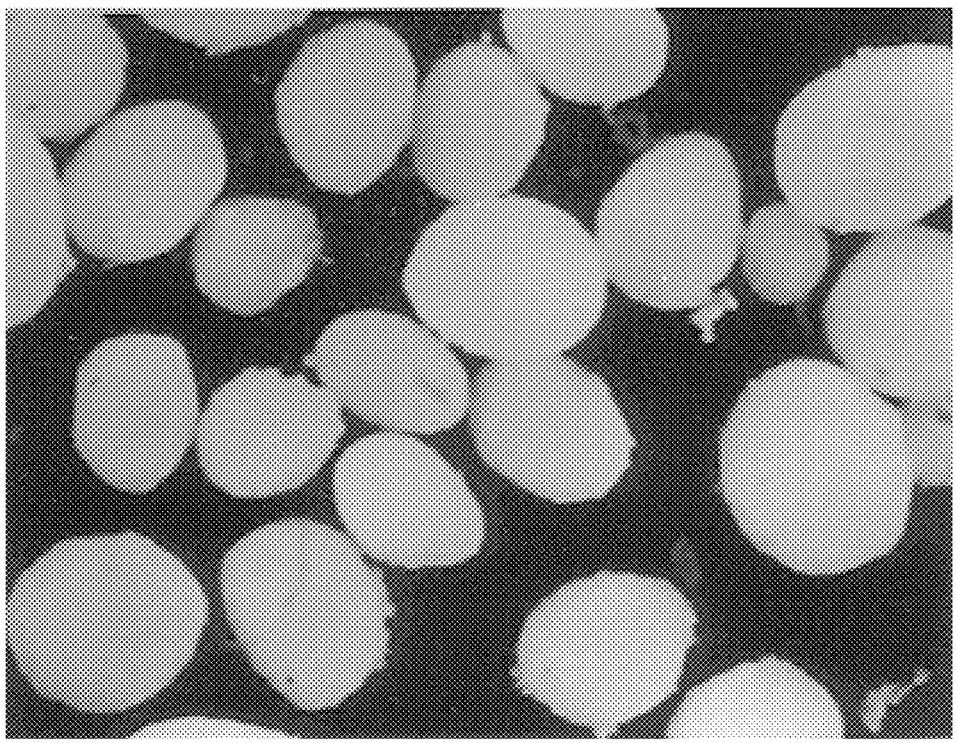
FIG. 2 is an optical microscopic photograph (magnification: ×200) showing a structure of particles in the modified PTFE granular powder of the present invention, which was obtained in Example 3.

The results are shown in FIGS. 2 and 3.

Comparative Examples 1 to 5

A modified PTFE granular powder was prepared in the game manner as in Example 1 except that the specific nonionic surfactant was not used. The same tests as in Example 1 were carried out. With respect to Comparative Example 1, a photograph (×200) was taken in the same manner as in Example 3. The results are shown in Table 2 and FIG. 4.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Conditions of preparation | | | | | | | | | | |
| Nonionic surfactant (kind) | Puronon #104 | Puronon #104 | Puronon #104 | Puronon #208 | Puronon #104 | Puronon #104 | Puronon #104 | Puronon #104 | Puronon #104 | Puronon #104 |
| Nonionic surfactant (surfactant/PTFE % by weight) | 0.100 | 0.025 | 0.010 | 0.100 | 0.025 | 0.025 | 0.025 | 0.025 | 0.025 | 0.025 |
| Liquid-liquid interface-forming organic liquid (kg) | 19.1 | 19.1 | 19.1 | 19.1 | 21.0 | 23.0 | 19.1 | 19.0 | 21.0 | 23.0 |
| Period of time of external circulation (min) | 20.0 | 20.0 | 20.0 | 20.0 | 20.0 | 20.0 | 5.0 | 10.0 | 20.0 | 20.0 |
| Period of time for maintaining at 37° to 39° C. (min) | 15.00 | 15.00 | 15.00 | 15.00 | 15.00 | 15.06 | 15.00 | 15.00 | 30.00 | 10.00 |
| Physical properties of granular powder | | | | | | | | | | |
| Apparent density (g/cm³) | 0.912 | 0.917 | 0.913 | 0.912 | 0.852 | 0.802 | 0.901 | 0.902 | 0.952 | 0.750 |
| Flowability (21 B method) | 8.0 | 8.0 | 8.0 | 8.0 | 8.0 | 8.0 | 8.0 | 8.0 | 8.0 | 8.0 |
| Angle of repose (degree) | 35.7 | 35.5 | 35.1 | 35.1 | 36.2 | 35.9 | 35.0 | 35.6 | 35.4 | 37.2 |
| Electrostatic charge (V) | 0 | 3 | 5 | 0 | 5 | 7 | 2 | 3.0 | 5 | 6 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Particle size distribution A (% by weight) | | | | | | | | | | |
| 10 on | 0.0 | 0.0 | 0.0 | 0.0 | 0.0 | 0.0 | 0.0 | 0.0 | 0.0 | 0.0 |
| 20 on | 0.0 | 0.5 | 0.5 | 0.0 | 0.0 | 4.5 | 10.9 | 3.4 | 0.6 | 1.4 |
| 32 on | 1.5 | 9.6 | 3.0 | 3.4 | 9.9 | 18.0 | 39.4 | 14.1 | 5.2 | 25.2 |
| 48 on | 15.0 | 23.5 | 47.1 | 50.6 | 54.9 | 61.3 | 35.0 | 34.9 | 53.5 | 66.0 |
| 60 on | 17.6 | 20.4 | 24.0 | 21.3 | 22.0 | 10.8 | 9.8 | 19.8 | 22.8 | 5.0 |
| 83 on | 40.0 | 25.5 | 18.3 | 16.9 | 11.0 | 4.5 | 4.4 | 11.4 | 15.1 | 1.8 |
| 83 pass | 28.0 | 20.4 | 7.1 | 7.9 | 2.2 | 0.9 | 0.4 | 10.5 | 2.7 | 0.6 |
| Particle size distribution B (% by weight) | 55.6 | 50.0 | 55.5 | 55.8 | 65.9 | 65.4 | 43.3 | 45.9 | 62.0 | 69.3 |
| Average particle size after granulation ($\mu$m) | 210.0 | 250.0 | 300.0 | 300.0 | 350.0 | 410.0 | 500.0 | 310.0 | 330.0 | 430.0 |
| Flowability f (sec/50 g) | 2.2 | 1.9 | 1.7 | 1.7 | 1.8 | 1.7 | 1.2 | 1.6 | 1.4 | 1.8 |
| Particle stability s (sec/50 g) | 2.2 | 1.9 | 1.8 | 1.8 | 2.0 | 1.9 | 1.4 | 1.7 | 1.4 | 2.0 |
| Particle stability coefficient (s/f) | 1.00 | 1.00 | 1.06 | 1.06 | 1.11 | 1.12 | 1.17 | 1.06 | 1.00 | 1.11 |
| Physical properties of molded article | | | | | | | | | | |
| TS (kgf/cm$^2$G) | 400 | 390 | 390 | 390 | 400 | 410 | 380 | 390 | 380 | 420 |
| EL (%) | 400 | 390 | 390 | 390 | 400 | 410 | 380 | 390 | 380 | 420 |
| Surface roughness ($\mu$m) | 2.5 | 2.7 | 2.7 | 2.7 | 2.2 | 2.1 | 2.7 | 2.6 | 2.9 | 2.0 |
| Whiteness (Z value) | 103 | 103 | 104 | 104 | 103 | 103 | 104 | 103 | 104 | 102 |
| Break down voltage (kV) | 11.3 | 10.8 | 10.3 | 10.4 | 12.3 | 12.8 | 10.2 | 10.7 | 10.2 | 13.2 |

TABLE 2

|  | Com. Ex. 1 | Com. Ex. 2 | Com. Ex. 3 | Com. Ex. 4 | Com. Ex. 5 |
|---|---|---|---|---|---|
| Conditions of preparation | | | | | |
| Nonionic surfactant (kind) | — | — | — | — | — |
| Nonionic surfactant (surfactant/PTFE % by weight) | — | — | — | — | — |
| Liquid-liquid interface-forming organic liquid (kg) | 19.1 | 21.0 | 23.0 | 23.0 | 23.0 |
| Period of time of external circulation (min) | 20.0 | 20.0 | 20.0 | 20.0 | 5.0 |
| Period of time for maintaining at 37° to 39° C. (min) | 15.00 | 15.00 | 15.00 | 20.00 | 15.00 |
| Physical properties of granular powder | | | | | |
| Apparent density (g/cm$^3$) | 0.812 | 0.832 | 0.850 | 0.801 | 0.821 |
| Flowability (21 B method) | 4.0 | 6.0 | 7.0 | 1.5 | 6.0 |
| Angle of repose (degree) | 38.2 | 37.8 | 37.5 | 42.2 | 38.2 |
| Electrostatic charge amount (V) | 300 | 280 | 280 | 280 | 280 |
| Particle size distribution A (% by weight) | | | | | |
| 10 on | 0.5 | 0.6 | 1.9 | 1.0 | 1.0 |
| 20 on | 1.7 | 1.6 | 7.8 | 5.9 | 8.1 |
| 32 on | 8.0 | 12.8 | 15.5 | 13.7 | 16.3 |
| 48 on | 16.0 | 23.1 | 24.7 | 24.9 | 25.8 |
| 60 on | 11.6 | 11.4 | 11.7 | 11.8 | 12.2 |
| 83 on | 26.1 | 22.9 | 26.8 | 27.1 | 22.4 |
| 83 pass | 36.1 | 27.6 | 11.7 | 15.7 | 14.2 |
| Particle size distribution B (% by weight) | 38.9 | 37.8 | 38.0 | 40.1 | 35.9 |
| Average particle size after granulation ($\mu$m) | 210.0 | 250.0 | 300.0 | 280.0 | 310.0 |
| Flowability f (sec/50 g) | 5.7 | 5.2 | 4.8 | 8.6 | 5.2 |
| Particle stability s (sec/50 g) | 8.2 | 7.1 | 6.5 | 15.8 | 6.8 |
| Particle stability coefficient (s/f) | 1.44 | 1.37 | 1.35 | 1.84 | 1.31 |
| Physical properties of molded article | | | | | |
| TS (kgf/cm$^2$G) | 400 | 390 | 390 | 400 | 390 |
| EL (%) | 400 | 390 | 390 | 400 | 390 |
| Surface roughness ($\mu$m) | 2.6 | 2.7 | 2.8 | 2.6 | 2.7 |
| Whiteness (Z value) | 95.7 | 96.7 | 95.8 | 94.7 | 95.2 |
| Break down voltage (kV) | 10.2 | 10.1 | 9.9 | 10.5 | 10.4 |

In the column of the particle size distribution A of Tables 1 and 2, 10 on, 20 on, 32 on, 48 on, 60 on and 83 on indicate the percentage of particles remaining on the 10 mesh, 20 mesh, 32 mesh, 48 mesh, 60 mesh and 83 mesh sieves, respectively. And, 83 pass represents the percentage of the particles passed through the 83 mesh sieve.

As is evident from the results in Tables 1 and 2, the modified PTFE granular powder which is obtained by the preparation process of the present invention has a large apparent density, particularly a small particle size, a narrow particle size distribution, a small electrostatic charge and a superior flowability in spite of the small particle size. Also, the molded article obtained from the granular powder is superior in tensile strength and elongation and has a low surface roughness, a high break down voltage and a high whiteness (Z value).

Figure 4:
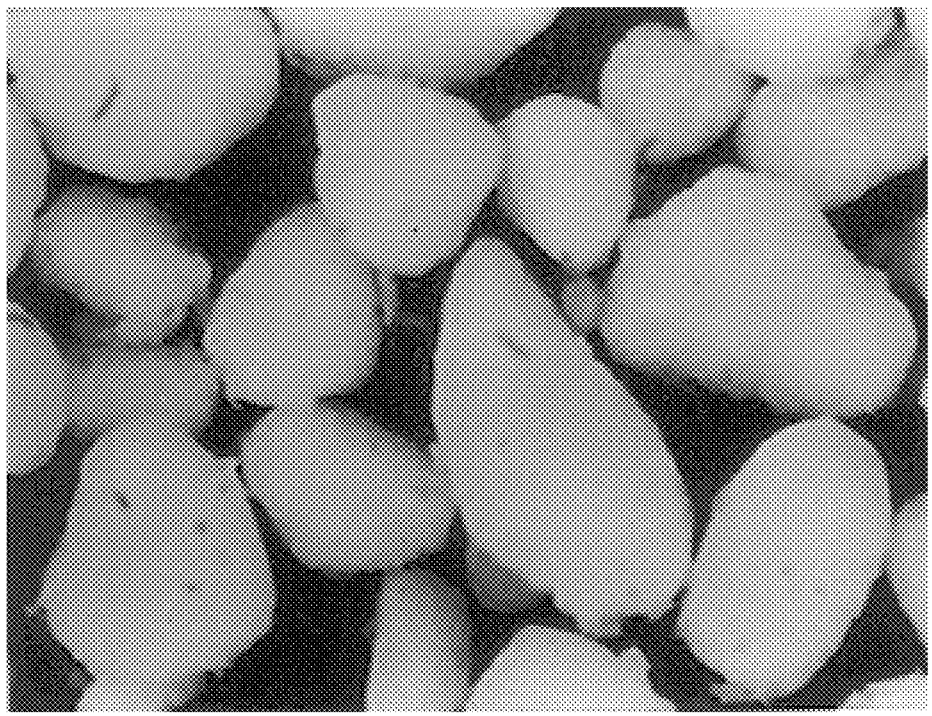
FIG. 4 is an optical microscopic photograph (magnification: ×200) showing a structure of particles in the modified PTFE granular powder, which was obtained in Comparative Example 1.

FIGS. 2 and 3 are optical microscopic photographs of Example 3, which show the structure of the particle in the modified PTFE granular powder of the present invention FIG. 4 is an optical microscopic photograph which shows the structure of the particle in the modified PTPR granular powder obtained according to a conventional granulation process without using a surfactant (Comparative Example 1).

As is evident from these Figures, though the particles in the modified PTFE granular powder of the present invention are almost spherical, the particles in the modified PTFE granular powder obtained according to the above-mentioned conventional granulation process is not spherical. Also, the particles in the modified PTFE granular powder of the present invention are evidently smaller than the particles in the modified PTFE granular powder obtained according to the above-mentioned conventional granulation process.

The reason why the modified PTFE granular powder of the present invention is superior in powder flowability, particularly particle stability in spite of the small average particle size seems that, for example, the shape of the particles are almost spherical as mentioned above.

INDUSTRIAL APPLICABILITY

The modified PTFE granular powder of the present invention which contains the almost spherical particles in its major portion has a large apparent density, a small average particle size, an electrostatic charge substantially approximate to zero and a narrow particle size distribution and is superior in powder flowability, particularly particle stability in spite of the small particle size. And, the molded product obtained from the granular powder is superior in tensile strength and elongation and has a low surface roughness, a high break down voltage and a high whiteness (Z value).

What is claimed is:

1. A modified polytetrafluoroethylene granular powder obtained by granulating a pulverized modified polytetrafluoroethylene powder prepared by suspension-copolymerizing 99 to 99.999% by mole of tetrafluoroethylene with 1 to 0.001% by mole of perfluoro(vinyl ether), in water under coexistence of a nonionic surfactant which has a hydrophobic segment comprising a poly(oxyalkylene) unit having 3 or 4 carbon atoms and a hydrophilic segment comprising a poly(oxyethylene) unit and an organic liquid which forms liquid-liquid interface with water, wherein:

(1) the granular powder has an electrostatic charge of not more than 50V,
   (2) the granular powder has an angle of repose of not more than 38 degrees,
   (3) the granular powder has an apparent density of not less than 0.7 g/cm³ and less than 0.8 g/cm³,
   (4) the granular powder having an average particle size of not less than 150 μm and less than 250 μm has flowability f of 2 to 3 sec/50 g and particle stability s of 2 to 3 sec/50 g,
   (5) the granular powder having an average particle size of 250 to 1000 μm has flowability f of 1 to 2 sec/50 g and particle stability s of 1 to 2 sec/50 g,
   (6) the granular powder has 1 to 1.3 of a particle stability coefficient s/f which is represented by particle stability s/flowability f,
   (7) a molded article obtained by molding the granular powder has a surface roughness of not more than 2.0 μm, and
   (8) a 0.1 mm thick skived sheet obtained by molding the granular powder has a break down voltage of not less than 12 kV.

2. The modified polytetrafluoroethylene granular powder of claim 1 which has an electrostatic charge of not more than 10 V.

3. A modified polytetrafluoroethylene granular powder obtained by granulating a pulverized modified polytetrafluoroethylene powder prepared by suspension-copolymerizing 99 to 99.999% by mole of tetrafluoroethylene with 1 to 0.001% by mole of perfluoro(vinyl ether), in water under coexistence of a nonionic surfactant which has a hydrophobic segment comprising a poly(oxyalkylene) unit having 3 or 4 carbon atoms and a hydrophilic segment comprising a poly(oxyethylene) unit and an organic liquid which forms liquid-liquid interface with water, wherein:

(1) the granular powder has an electrostatic charge of not more than 50V,
   (2) the granular powder has an angle of repose of not more than 37 degrees,
   (3) the granular powder has an apparent density of not less than 0.8 g/cm³ and less than 0.9 g/cm³,
   (4) the granular powder having an average particle size of not less than 150 μm and less than 250 μm has flowability f of 2 to 3 sec/50 g and particle stability s of 2 to 3 sec/50 g,
   (5) the granular powder having an average particle size of 250 to 1000 μm has flowability f of 1 to 2 sec/50 g and particle stability s of 1 to 2 sec/50 g,
   (6) the granular powder has 1 to 1.3 of a particle stability coefficient s/f which is represented by particle stability s/flowability f,
   (7) a molded article obtained by molding the granular powder has a surface roughness of not more than 2.5 μm, and
   (8) a 0.1 mm thick skived sheet obtained by molding the granular powder has a break down voltage of not less than 11 kV.

4. The modified polytetrafluoroethylene granular powder of claim 3 which has an electrostatic charge of not more than 10 V.

5. A modified polytetrafluoroethylene granular powder obtained by granulating a pulverized modified polytetrafluoroethylene powder prepared by suspension-copolymerizing 99 to 99.999% by mole of tetrafluoroethylene with 1 to 0.001% by mole of perfluoro(vinyl ether), in water under coexistence of a nonionic surfactant which hag a hydrophobic segment comprising a poly(oxyalkylene) unit having 3 or 4 carbon atoms and a hydrophilic segment comprising a poly(oxyethylene) unit and an organic liquid which forms liquid-liquid interface with water, wherein:

(1) the granular powder has an electrostatic charge of not more than 50 V,
(2) the granular powder has an angle of repose of not more than 36 degrees,
(3) the granular powder has an apparent density of not less than 0.9 g/cm$^3$,
(4) the granular powder having an average particle size of not less than 150 μm and less than 250 μm has flowability f of 2 to 3 sec/50 g and particle stability s of 2 to 3 sec/50 g,
(5) the granular powder having an average particle size of 250 to 1000 μm has flowability f of 1 to 2 sec/50 g and particle stability s of 1 to 2 sec/50 g,
(6) the granular powder has to 1.3 of a particle stability coefficient s/f which is represented by particle stability s/flowability f,
(7) a molded article obtained by molding the granular powder has a surface roughness of not more than 3.0 μm, and
(8) a 0.1 mm thick skived sheet obtained by molding the granular powder has a break down voltage of not less than 10 kV.

6. The modified polytetrafluoroethylene granular powder of claim 5 which has an electrostatic charge of not more than 10 V.

* * * * *